June 13, 1944.                 G. R. PENNINGTON                     2,351,286
                                 FLUID COUPLING
                              Filed May 13, 1940            2 Sheets-Sheet 1
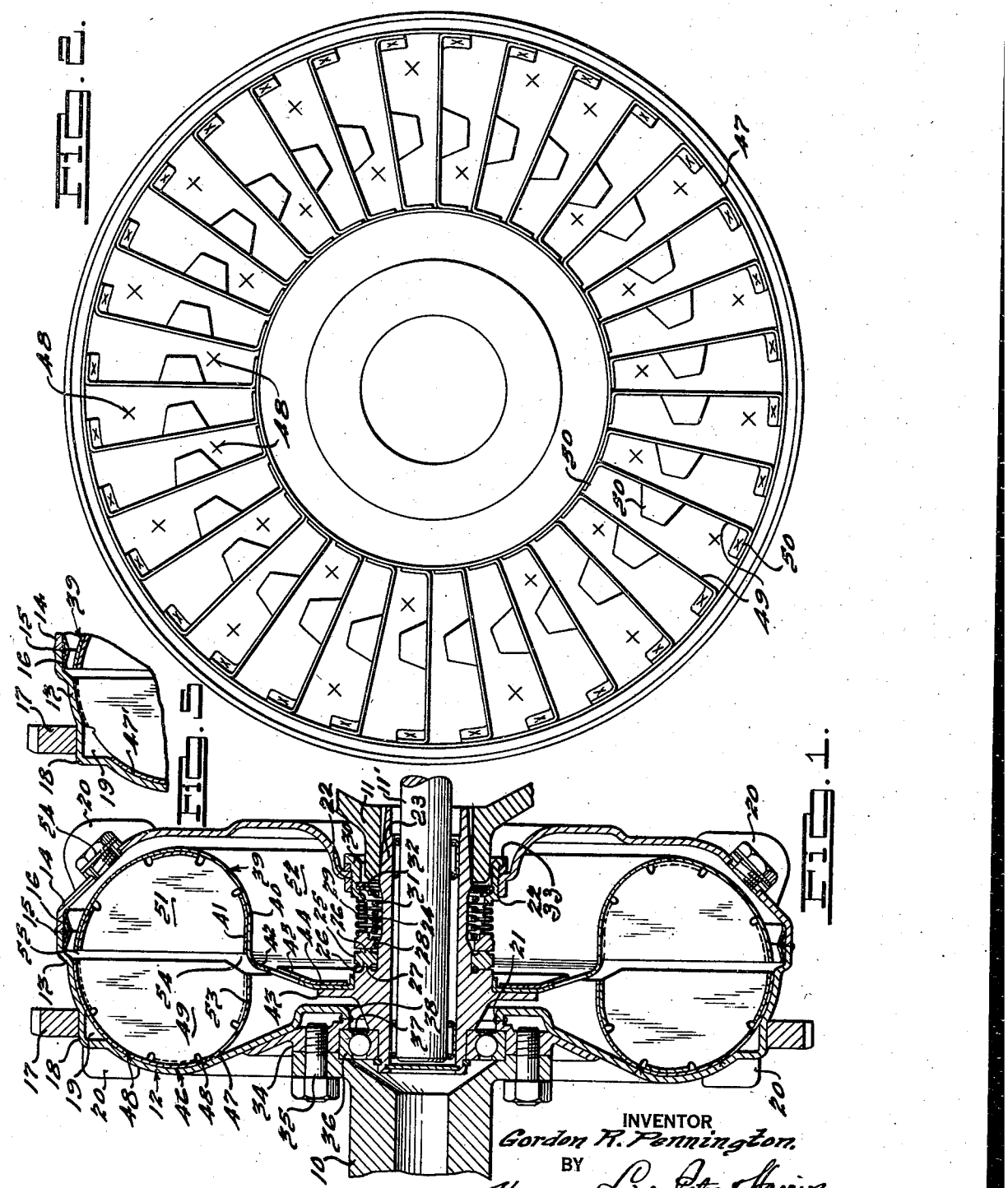
INVENTOR
Gordon R. Pennington
BY
ATTORNEYS.

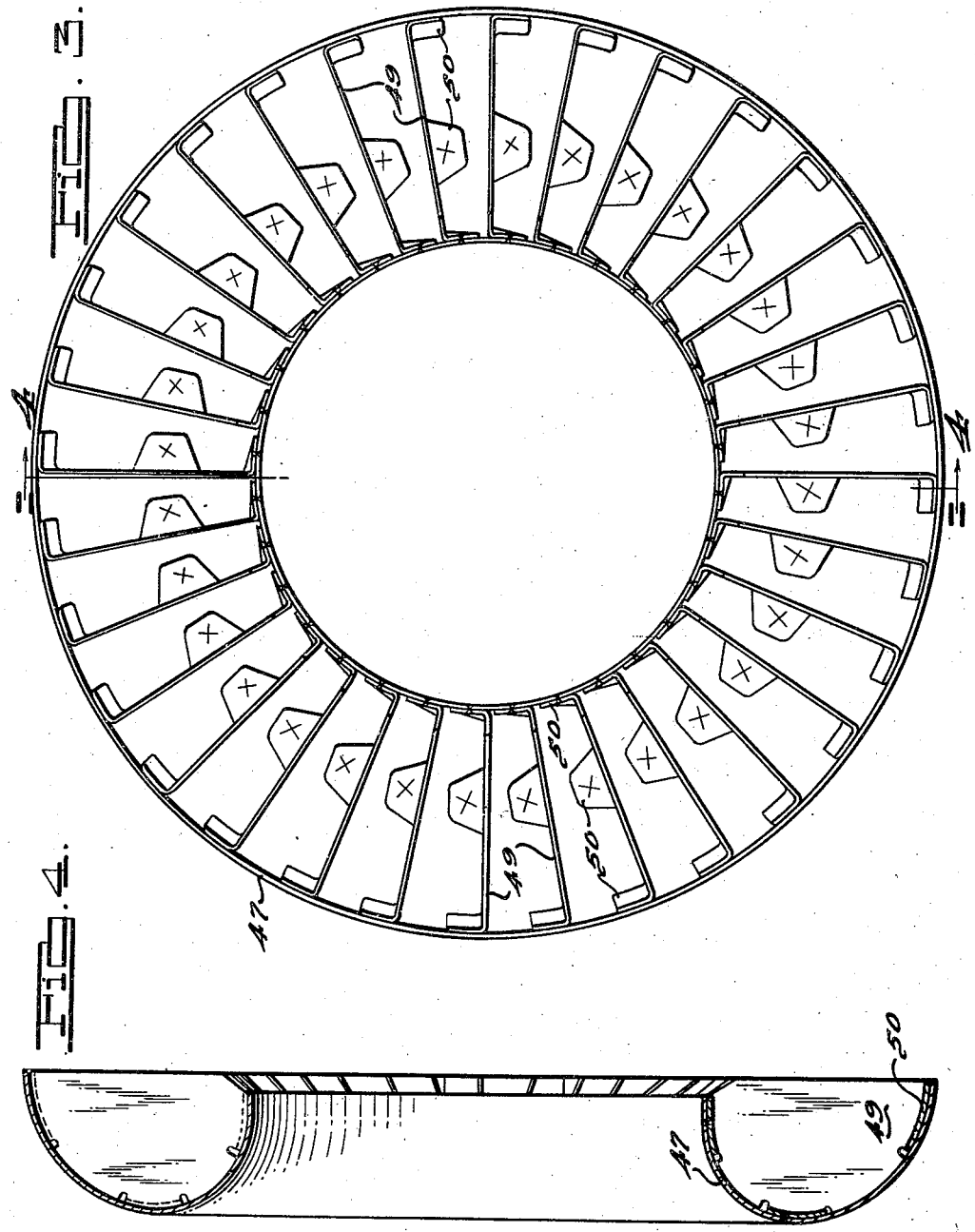

Patented June 13, 1944

2,351,286

UNITED STATES PATENT OFFICE 2,351,286

FLUID COUPLING

Gordon R. Pennington, Bloomfield Hills, Mich., assignor to Chrysler Corporation, Highland Park, Mich., a corporation of Delaware Application May 13, 1940, Serial No. 334,755

1 Claim. (Cl. 60—54)

This invention relates to fluid couplings of the kinetic type.

An object of the invention is the provision of a coupling of the foregoing type which is highly efficient in the transmission of driving torque horsepower under average cruising conditions but which will operate with a relatively low drag when in stalled condition. In carrying out the above I preferably employ a coupling wherein the chamber in which the working fluid circulates is bounded by substantially smooth flowing lines and wherein the relatively low drag or high slip at stall conditions is brought about by partially unloading this chamber. This unloading action is accomplished by so arranging and proportioning the fluid working chamber as to provide a reservoir within the normal confines of the coupling into which the working fluid is evacuated from the working chamber under high slip conditions without the aid of scoops or other similar means, at the same time maintaining the axial and radial dimensions of the coupling at a minimum. A coupling having the foregoing characteristics is particularly adapted for use in the drive of motor vehicles wherein it is highly desirable to have little or no drag when the vehicle is at rest, with the prime mover therefor operating, in order to prevent creep of the vehicle.

Another object of the invention is the provision of a coupling having the foregoing characteristics which is free from bulges and abnormal contours in accommodating the fluid working chamber and an evacuating reservoir, the working chamber being confined to the radially outer region of the coupling and the reservoir arranged at the radially inner region thereof, the relative capacities of the working chamber and reservoir being such that a substantial portion of the fluid content of the chamber can be evacuated therefrom into the reservoir when the coupling is in stalled condition.

A still further object of the invention is the provision, in a coupling of the foregoing type, of improved means for supporting the vaned parts thereof, more particularly the vaned part of the impeller structure, so positioned that at least a portion of such supporting means not only provides a wall delimiting a portion of the fluid working chamber but also provides a wall directly separating the latter from the reservoir into which fluid is evacuated under high slip conditions.

A still further object of the invention is to provide a hydraulic coupling wherein the fluid working chamber forming impeller and runner vaned structures are so positioned and so contoured as to develop relatively high efficiency in torque transmission for a relatively small area of working surface, and which will facilitate evacuation of the fluid from the working chamber therefor, without the use of baffles, scoops or the like, to effect relatively low drag when high slippage occurs between the impeller and runner structures.

Another object of the invention is to provide a coupling fabricated from a plurality of sheet metal stampings, preferably welded together.

Other objects and advantages of the invention will be more apparent from the following description taken in connection with the accompanying drawings, in which:

Fig. 1 is a sectional elevational view of a hydraulic coupling embodying the invention.

Fig. 2 is a side elevational view of the inner side of the impeller structure shown in Fig. 1.

Fig. 3 is a side elevational view of the inner side of a portion of the impeller structure prior to assembly as shown in Figs. 1 and 2.

Fig. 4 is a sectional view taken on line 4—4 of Fig. 3.

Fig. 5 is a fragmentary sectional elevational view similar to Fig. 1 but showing a modified form of the invention.

The invention is illustrated and described in connection with a fluid coupling of the kinetic type having a toroid circuit for the working liquid formed by juxtaposed annular vaned impeller and runner structures, dished in cross-section and opening one toward the other. While the improved coupling is particularly adapted for establishing a drive between a driving part 10, such as the crankshaft of an internal combustion engine, and a driven part 11, it will be understood that couplings embodying the invention may be utilized in drives other than those for motor vehicles.

The coupling includes an annular casing 12, preferably of sheet metal and having spaced separately formed walls 13 and 14 having the edge portions thereof welded together as indicated at 15, with an annular band 16 bridging the edge portions for preventing loose welding flash from gaining access to the interior of the casing. When employed as herein contemplated, the coupling functions as a flywheel structure and is provided with a ring gear 17, a portion of the wall 13 being formed to provide an external seat 18 for the gear 17 and a resultant pocket 19 interiorly of the casing. A plurality of cooling fins 20 are suitably secured to the casing 12 for radiating heat therefrom.

The casing side walls 13 and 14 have openings 21 and 22 respectively, providing a central coupling opening through which extends a hub forming sleeve 23 splined to the driven part 11, the latter being adapted to be releasably connected with the shaft 11' journaled in the sleeve 23. A sealing unit, generally indicated at 24, cooperates with the hub for sealing the opening 22. The unit 24 includes a ring 25 mounted on the hub or sleeve 23 in a manner to accommodate rotation relative thereto and having opposed side sealing ribs 26, one in sealing engagement with the adjacent abutment of the hub 23 and the other in sealing engagement with a ring 28 encircling the hub. A Sylphon bellows has one end secured to the ring 28 and the opposite end thereto to a ring 30 threaded in the wall bounding the opening 22 of the casing wall 14. A coil spring 31, acting between an annular abutment 32 retained in spring loading position by the ring 30 and the ring 28, urges the latter into friction sealing engagement with the adjacent sealing rib 26 of the ring 25 and the other rib 26 into similar engagement with the abutment 27. The ring 25 has sufficient clearance with the sleeve 23 to accommodate itself to irregularities or eccentricities resulting from manufacture or assembly. A gasket 33 is interposed between a radial flange of the ring 30 and the outer surface of the wall 14.

The casing 12 is drivingly secured to the driving part 10 by means of a centrally apertured annulus 34 secured as by welding to the casing wall 13 and is secured by a plurality of bolts 35 to a flange of the driving part 10. The sleeve 23 is suitably journaled in the annulus by a bearing unit 36, the right hand end faces, as viewed in Fig. 1 of the races thereof abutting respectively the annulus 34 and sleeve 23. A retainer 37 extends between the races preventing passage of metal particles into the ball races and the wall 13 extends over the openings in the annulus 34 accommodating the bolts 35 and has an axially terminal flange 38 abutting the radially inner part of the annulus and welded thereto.

Positioned within the casing are impeller and runner structures cooperating to form a fluid working chamber for the circulation of the working fluid, these structures being so located that the chamber is confined to the radially outer part of the casing thus providing a reservoir within the casing into which the working fluid can be readily evacuated from the working chamber under certain operating conditions as hereinafter set forth.

The fluid working chamber is substantially filled by the fluid operating medium when the coupling is operating with relatively low or no slip between the impeller and runner structures at normal engine speeds. However, when the coupling operates with the maximum slip between these structures it is desirable to unload the working chamber by evacuating the fluid therefrom to the reservoir and to impede the immediate and direct return thereof to the working chamber, thereby minimizing the torque transmitted from the impeller to the runner when it is desired that the vehicle, for example, remain at rest with the prime mover operating.

The fluid working chamber is formed by juxtaposed, dished impeller and runner structures each including circumferentially spaced, radially extending vanes providing fluid passages. The runner structure generally indicated by the numeral 39, included an annular dished sheet metal retainer 40 opening toward the side wall 13 of the casing and having circumferentially spaced, radially extending vanes 41 each provided with suitable tabs which are welded to the retainer 40 as more specifically hereinafter set forth in connection with the impeller structure. The retainer 40 includes an annular attaching flange 42 extending inwardly from the vaned part for attachment as by welding to an annular radially extending flange 43 of the sleeve 23. The flange 42 is reinforced by an annular plate 44 secured thereto by welding, the flange 42 and plate 44 having registering openings 45 therein.

The impeller structure generally indicated by the numeral 46, includes an annular dished sheet metal vane retainer 47 which is seated in the dished part of the radially outer portion of the casing wall 13 and driving secured thereto as by welding as indicated at 48 in Figs. 1 and 2, the welding being at alternately radially spaced locations as indicated in Fig. 2. A plurality of passage forming circumferentially spaced, radially extending vanes 49 are provided each having tabs 50 welded to the retainer 47. The retainer 47 and vanes 49 are first brought to the assembly shown in Figs. 3 and 4 and this assembly is then secured to the casing wall 13 to provide the structure shown in Fig. 1.

The structures 39 and 46 cooperate to provide a chamber, indicated at 51, for the circulation of the fluid working medium, the chamber being located in the radially outer portion of the coupling and each casing side wall 13 and 14 extending radially inwardly beyond the chamber and bounding a reservoir indicated at 52 radially intermediate the chamber 51 and the sleeve 23, with the flanges 42 and 43 and plate 44 dividing this reservoir into two compartments and the openings 45 accommodating fluid transfer between the latter.

The casing wall 14 is spaced from the runner vane retainer 40 to accommodate the flow of fluid from the reservoir 52 radially outwardly and thence into the working chamber 51. The impeller vane retainer 47 has the major portion thereof abutting the casing wall 13 and thus cooperates therewith to bound the major portion of that part of the chamber 51 formed by the impeller structure, the retainer 47 masking the pocket indicated at 19. The radially inner portion 53 of the retainer 47 projects from the side wall 13 toward and terminates adjacent the runner structure, thus supporting the radially inner ends of the vanes 49 in axially spaced relation to the wall 13 and thereby avoiding the necessity for imparting to the wall that contour which would otherwise be necessary where the radially inner ends of the vanes are secured directly to the wall. This arrangement also has the advantage of permitting the wall portion to be properly contoured to facilitate attachment thereof to the driving member 10. The radially inner portion 53 of the retainer 47 delimits a portion of the fluid working chamber independently of the adjacent casing side wall, this vane retainer portion overlying the reservoir 52 and impeding direct passage of fluid therefrom to the chamber 51.

During the normal operation of the coupling as when the engine is driving the car the fluid in the impeller structure is thrown radially outward under the influence of centrifugal force set up by rotation and is rotated about the axis of rotation of the coupling. The arcuate contour of the fluid passages of the impeller structure directs the fluid to the runner structure to transmit its rotation to the latter. When the impeller and runner structures are turning at different speeds, the fluid is circulated by the differential centrifugal force between the two structures and therefore due to the contour of the fluid passages of the vaned structures, about an axis transverse with respect to the axis about which the coupling rotates. When the impeller and runner structures operate at relatively low slip the latter circulation is at a relatively low velocity. When the impeller and runner structures operate at relatively high slip, it being understood that one hundred percent slip between these structures represents a stalled condition of the runner structure at which time the latter is completely restrained against rotation, fluid is circulated around the said transverse axis at a relatively high velocity.

The said circulation of fluid around the transverse axis develops a centrifugal force in the particles of fluid with respect to that axis. At the outer diameter of the casing this centrifugal force adds to that developed as a result of rotation around the main longitudinal axis of the coupling. However, at the inner diameter of the working chamber the centrifugal force with respect to the transverse axis opposes that existing with respect to the main longitudinal axis. Consequently, under relatively high slip conditions and relatively low coupling speeds the centrifugal force with respect to the transverse axis becomes greater than that with respect to the longitudinal axis at the region 54 and the liquid at the radialy inner portion of the chamber moves out of the working chamber into the reservoir 52.

When the conditions of operation are so altered that the speed of the coupling is relatively increased or the slip is relatively decreased, a condition is reached in which the centrifugal force at the region 54 around the transverse axis will be less than the centrifugal force around the longitudinal axis and the force of the latter will prevail and the liquid will return to the chamber 51. The flow of fluid at the region 54 as aforesaid is in addition to the normal fluid flow at the region 55.

The portion 53 of the impeller vane retainer 47 which overlies the chamber 52 prevents the too rapid return of the fluid into the working chamber 51 as a result of rotation of the impeller structure when the balance of the centrifugal forces is causing the liquid to move radially outwardly at the region or gap 54.

To increase to the practical maximum the volume of the chamber 52, the radially inner portion of the impeller and runner vaned structures adjacent the region 54 have a contour substantially flat in cross-section, this contoured portion directly overlying the reservoir 52. The flat contour does not impair efficiency of the coupling for transmission of driving torque at low slip because it conforms approximately to the natural path of flow of the liquid in this region under low slip operating conditions when the centrifugal force relative to the main or longitudinal axis is greater than the centrifugal force relative to the transverse axis. The contour of the bounding wall at the region 55 and adjacent thereto represents in cross-section a continuous radius of curvature for facilitating the desired circulation of fluid in this region.

In the Fig. 5 embodiment of the invention, the coupling and parts thereof are generally similar to the showing in Fig. 1 and like parts have been identified by like numerals. However, in this form of the invention the radially outer portion of the impeller vane retainer 47' terminates short of and does not mask the pocket 19. The tab at the radially outer end of each vane is secured preferably by welding directly to the casing wall 13.

Although but several specific embodiments of the invention have herein been shown and described, it will be understood that various changes in the size, shape and arrangement of parts may be made without departing from the spirit of my invention or from the scope of the appended claim.

I claim:

In a fluid coupling, a rotatable casing including a sheet metal wall having an annular dish-shaped portion, and a central opening, a part of said wall portion being deflected relative to an adjacent part to form an annular seat on the external surface thereof and a registering internal pocket, a ring gear on said seat, an annular dish-shaped sheet metal vane carrying member received in said wall dish-shaped portion and drivingly secured thereto, said member extending across said pocket, and a hub-like member for drivingly securing the casing to a coupling driving means having an attaching face abutting the external surface of said dish-shaped wall portion at a point intermediate said seat and the axis of rotation of the casing and welded thereto, said hub-like member having a central journalling opening therein and an attachment-receiving body intermediate its attaching face and central opening provided with spaced attachment receiving openings, said wall overlapping said perforated body in spaced relation thereto and having the edge portion at said opening deflected generally longitudinally with respect to said axis, the end face of said deflected edge portion abutting said hub-like member in fluid tight relation therewith, and attaching studs respectively threaded into said attachment receiving openings and removable therefrom when the hub-like member is welded to said casing wall as aforesaid.

GORDON R. PENNINGTON.